United States Patent [19]
Hosegood

[11] 3,926,720
[45] Dec. 16, 1975

[54] GAS COOLED NUCLEAR REACTOR FUEL ELEMENTS

[75] Inventor: Samuel Brittan Hosegood, Wareham, England

[73] Assignee: United Kingdom Atomic Energy Authority, London, England

[22] Filed: May 24, 1973

[21] Appl. No.: 363,567

[30] Foreign Application Priority Data
June 9, 1972 United Kingdom............... 27053/72

[52] U.S. Cl................................. 176/18; 176/83
[51] Int. Cl.² ..................... G21C 3/08; G21G 1/02
[58] Field of Search .................... 176/17, 18, 81, 83

[56] References Cited
UNITED STATES PATENTS

| | | | |
|---|---|---|---|
| 3,268,410 | 8/1966 | King.................................. | 176/17 |
| 3,546,068 | 12/1970 | Schluderberg...................... | 176/18 |
| 3,738,912 | 6/1973 | Rachor et al. ..................... | 176/81 |

*Primary Examiner*—Stephen C. Bentley
*Attorney, Agent, or Firm*—Larson, Taylor and Hinds

[57] ABSTRACT

A nuclear fuel element for a gas-cooled nuclear reactor of the thermal type comprises an outer region containing fertile material enclosing an inner region containing fissile plutonium.

The inner region is disposed so as to be cooled by the reactor coolant.

A plurality of fuel elements may be distributed in an interchangeable block which forms a reasonable part of a reactor core. The block defines channels through which reactor coolant is caused to flow so as to remove heat from the fissile plutonium.

7 Claims, 5 Drawing Figures

GAS COOLED NUCLEAR REACTOR FUEL ELEMENTS

BACKGROUND OF THE INVENTION

This invention relates to gas cooled nuclear reactors of the thermal type and to nuclear fuel elements therefore.

High Temperature Gas-Cooled nuclear reactors of the thermal type can be designed with a variety of form of fuel element, (e.g., rods, spheres, prismatic graphite blocks containing channels for fuel and coolant) and for operation on a wide range of fuel cycles (e.g., U-235 - Th - U-233, U-235 - U-238 - Pu - 239).

In most cases an initial supply and make-up of U-235 is required in enriched form (highly enriched for the U-235 - Th - U-233 fuel cycle or low enriched for the U-235 - U-238 - Pu-239 fuel cycle). Since a large program of thermal reactors will require correspondingly large enrichment plant capacity to provide the new and make-up U-235 and since there is growing concern over the possibility of a world shortage of enrichment capacity in the early 1980's, the possibility of replacing some or all of the U-235 (above that contained in any natural uranium in the fuel) by plutonium is an attractive one.

One difficulty which arises in the use of plutonium in a thermal reactor is that the high thermal fission cross-section of Pu-239 results in a comparatively low thermal neutron flux for a given heat rating in the plutonium fuel. Since the nuetron capture cross-sections of the fertile materials (U-238 or Thorium) used are comparatively low, it becomes difficult to pack sufficient of these materials into the space available to obtain a satisfactory breeding or conversion ratio. Put in another way, this implies that the plutonium tends to burn-out too fast, relative to the rate of production of new fissile material by conversion of the fertile material.

SUMMARY OF THE INVENTION

According to one aspect of the invention, a nuclear fuel element in or for a gas-cooled nuclear reactor of the thermal type comprises an outer region containing fertile material and enclosing an inner region containing fissile plutonium, the inner region being disposed so as to be cooled by the reactor coolant.

According to another aspect of the invention, a nuclear fuel unit for forming part of the core of a gas-cooled nuclear reactor of the thermal type comprises a block of moderator material containing a plurality of nuclear fuel elements distributed in the block so that they are surrounded by moderator material, each fuel element comprising an outer region containing fertile material and an inner region containing fissile plutonium, means being provided for passing coolant gas through the block so as to remove heat from the inner regions of the fuel elements therein.

According to yet another aspect of the invention, a gas-cooled nuclear reactor of the thermal type has a reactor core comprising a plurality of nuclear fuel elements distributed in a mass of moderator material so that the fuel elements are surrounded by moderator material, each fuel element comprising an outer region containing fertile material and an inner region containing fissile plutonium, means being provided for passing coolant gas through the reactor core so as to remove heat from the inner regions of the fuel elements.

A protective (unfuelled) layer may be interposed between each inner region and reactor coolant, the thickness, density and moderating properties of the layer being consistent with its duties as a protective or sacrificial layer.

Each outer region may be primed with some fissile material so as to contribute to the initial heat generation. The bulk of the mass of moderator material will preferably lie outside the outer or fertile regions. Additional unfuelled protective layers and/or coolant flow passages may be interposed between this moderator material and the outer regions or coolant flow channels may be provided in the mass of moderator material.

In this way neutrons thermalised in the mass of moderator material must diffuse through the outer regions before reaching the inner plutonium-containing regions, while heat generated in the inner regions is conducted away by coolant flow through the reactor core.

A fuel element according to the invention may be formed so as to enable the inner, plutonium-containing, region to be renewed independently of the outer or fertile region. This provides important additional advantages, namely that the inner, plutonium-containing region can be renewed at more frequent intervals than the outer, fertile region, that it can be separated from the fertile region before reprocessing and that its fabrication processes can be separated from those of the fertile regions up to the final assembly stage of the reactor fuel elements.

BRIEF DESCRIPTION OF THE DRAWINGS

The various aspects of the invention will now be described by way of example with reference to:

FIGS. 1 to 5 of the accompanying drawings wherein FIGS. 1 to 4 are fragmentary plan views of nuclear fuel units for a reactor core of a gas-cooled nuclear reactor of the thermal type, and FIG. 5 is a semidiagrammatic side view in section of such a nuclear reactor.

DETAILS OF THE EMBODIMENTS

Figure 1:
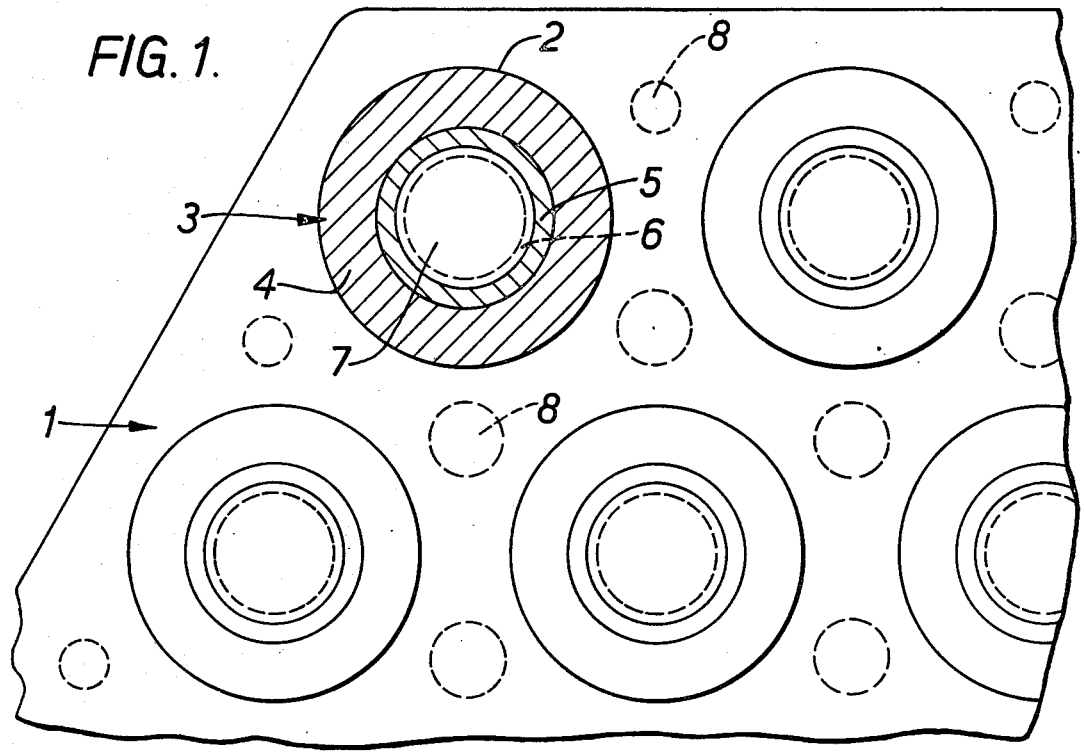

FIG. 1 shows a part of a reactor core comprising a plurality of nuclear fuel elements 3 distributed in a mass of moderator material provided by graphite blocks 1 so that the fuel elements 3 are surrounded by moderator material. Each fuel element 3 comprises an outer region 4 containing fertile material (U-238 or thorium) and an inner region 5 containing fissile plutonium. Means comprising coolant channels 7 are provided for passing coolant gas (helium) through the reactor core so as to remove heat from the inner regions 5 of the fuel elements 3.

In further detail, the graphite blocks 1 have an array of parallel axial holes 2 of (preferably) circular-section machined in it, which holes locate the fuel elements 3. The block 1 and its fuel elements 3 together comprise a fuel unit.

The fuel elements 3 comprise closely fitting fuel compacts of annular form. Each compact comprises an outer region 4 of annular form containing fertile fuel particles coated with fission product retaining material, and an inner region 5 also of annular form and containing fissile plutonium-bearing particles coated with fission product-retaining material. The first region 4 encloses the second region 5, the first and second regions being contiguous, as shown. A thin annular layer 6 of unfuelled protective or sacrificial material such as graphite may optionally be provided on the innermost face, and, if desired, on the outer and end faces of each fuel element 3. Reactor coolant gas flows through coolant channels 7 inside the inner regions 5 so as to cool the said regions. Additionally, the moderator block 1 may define additional coolant channels 8 disposed between adjacent fuel elements 3. Coolant flowing through the additional channels 8 results in the removal of heat from the fissile material without the actual passage of coolant therethrough.

In operation, neutrons thermalized in the mass of moderator material provided by the blocks 1 have to diffuse through the outer (fertile) regions 4 before entering the inner (fissile) regions 5, while heat generated in the inner regions 5 is removed by coolant gas flow through the reactor core, by way of the coolant channels 7. The fertile material in the outer regions 4 is converted to fissile material by epithermal and thermal neutrons re-entering the fertile material after slowing down in the graphite moderator. The arrangement results in the capture of substantially more neutrons by the fertile material, relative to those which re-enter the fissile material.

Figure 2:
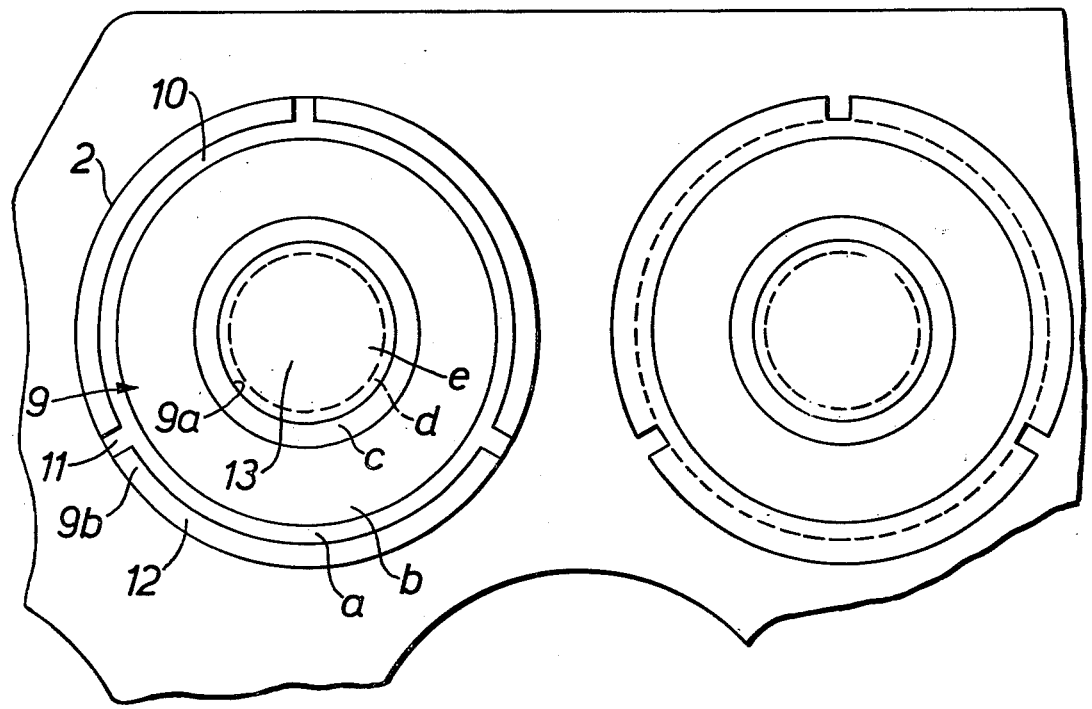

FIG. 2 shows a block and "pin" type nuclear fuel unit wherein, in each of the holes 2, nuclear fuel elements comprising fuel pins 9 of tubular form are mounted in the graphite block so as to be cooled by coolant flow over both inside and outside surfaces 9a, 9b of the elements. The fuel elements 9 may be enclosed in outer graphite tubes 10 or may be moulded from fuel and graphite matrix material, including an unfuelled layer 10 at the outside. Ribs or local projections 11 are provided to centralize the fuel elements 9 in the holes 2. The ribs 11 may be provided on the walls of the elements 9 or, alternatively, on the walls of the holes 2. The ribs 11 space the fuel elements 9 from the walls of the holes 2 so as to define annular coolant channels 12 whereby reactor coolant gas flows over the outer surfaces 9b in passage through the reactor core. Surfaces 9a are cooled by coolant flowing through the bores 13 of the fuel elements 9.

The composition of one fuel element 9 illustrated in FIG. 2 is as follows:
  a. Unfuelled outer layer or enclosing graphite tube.
  b. Annular outer region of particles bearing fertile material (U-238 or thorium).
  c. Annular inner region of plutonium-bearing particle fuel material.
  d. (Optionally) an inner unfuelled protective layer.
  e. The central cooling channel whereby heat is removed from the inner region c.

The outer region b encloses the inner region c and is contiguous therewith. It is preferred that both outer and inner a, b regions should be incorporated in a single pressed compact, which would be no less robust than those which have been developed previously for High Temperature Reactor use. This combined compact may be manufactured in a variety of ways. For example, a cylindrical female mould can have an oversize cylindrical mandrel co-axially mounted in it, leaving an annular space which can be filled with overcoated particles of fertile material mixed with a binder resin. Light axial pressure from a tubular die can be used to consolidate the mixture sufficiently to allow the cylindrical mandrel (which may be slightly tapered) to be removed. A second circular mandrel of diameter appropriate for producing the final compact bore size is then positioned co-axially within the mould and the annular space between this second mandrel and the fertile compact is filled with overcoated particles of plutonium mixed with a binder resin. Final pressing and curing of the complete compact then takes place by methods which have become conventional for the production of annular compacts, after which the complete compacts can be heat-treated in the normal way. Unfuelled surface layers can be incorporated, if and where desired, by known techniques.

Alternatively the annular compacts may be made by forming each region as a separate component and joining them together afterwards.

Figure 3:
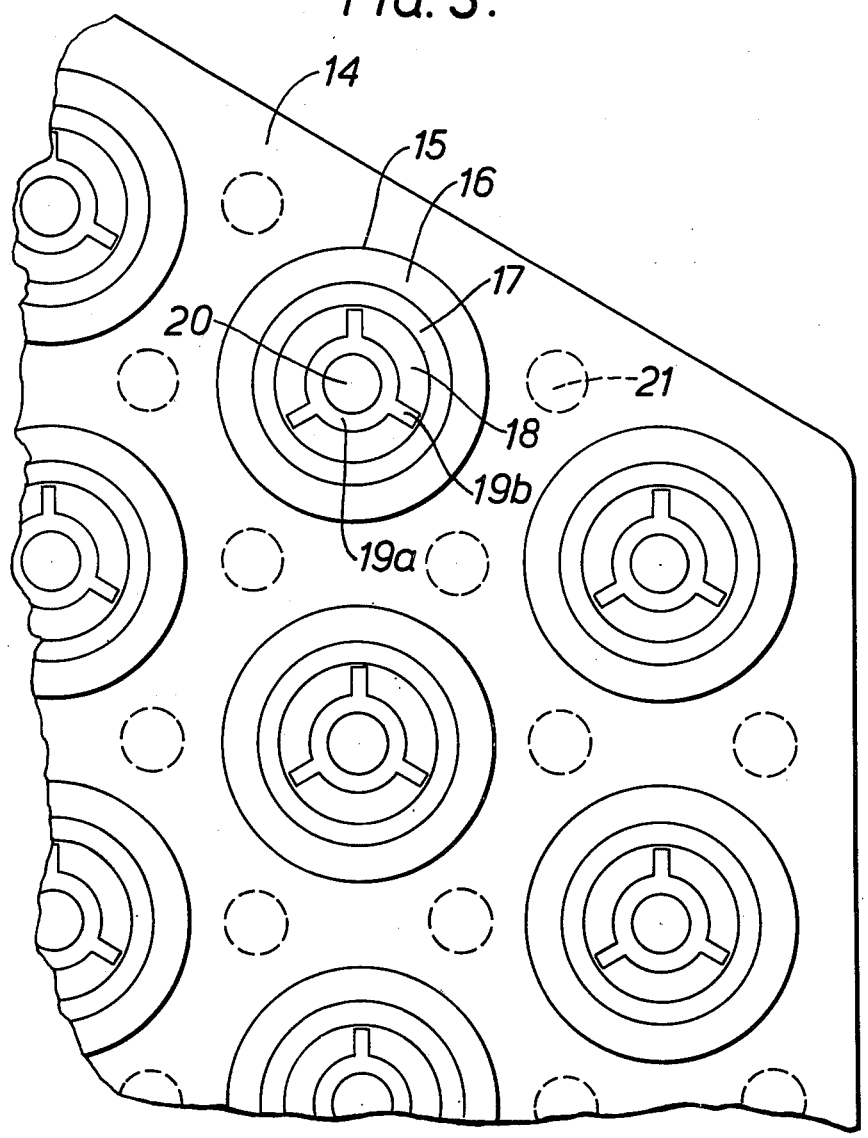

With reference now to FIG. 3, a nuclear fuel unit for a gas-cooled reactor of the thermal type is shown wherein the plutonium fuelled inner regions 20 can be renewed independently of the outer fertile (U-238 or thorium) regions 16. The unit is made by machining an array of circular-section holes 15 in a graphite moderator block 14. In each of these holes 15 closely fitting compacts of annular form comprising outer regions are loaded, each compact containing fertile material, which may optionally be primed with a small proportion of fissile material to contribute to the initial heat generation. On their inner surfaces the outer regions 16 may optionally be protected by graphite tubes or unfuelled layers 17.

Annular coolant channels 18 are provided between the inside surfaces of the fertile outer regions 16 (or their protective annular layers 17) and the outside surfaces of plutonium-bearing fuel pins 20 which comprise the inner regions and which are arranged co-axially with the coolant channels 18. The arrangement is such that the outer regions 16 enclose the fuel pins 20 but may be spaced therefrom by the layers 17 and/or the annular coolant channels 18. Each plutonium-bearing fuel pin 20 contains plutonium fuel in the form of cylindrical compacts of coated particles and an outer protective graphite tube or unfuelled layer 19a equipped with projecting spacers or ribs 19b to support and centralize the pin in its coolant channel 18.

Additional coolant passages 21 may optionally be provided in the moderator blocks 14.

As in the arrangements of FIGS. 1 and 2, the reactor core comprises a plurality of blocks 14 so that the blocks form a mass of moderator material with nuclear fuel elements distributed within said mass. As before, neutrons thermalized in the mass of graphite diffuse through the outer regions 16 before entering the inner regions 20 while heat generated in the inner regions 20 is removed by coolant flow through the reactor core, by way of the channels 18.

With a design of this type, when the inner, plutonium-containing, region 20 becomes depleted, the block 14, complete with both fertile material and plutonium fuel can be discharged from the reactor to a suitably shielded position. Remote handling equipment can then be used to remove the spent plutonium fuelled pins 20 and replace them with new ones, leaving the fertile material compacts 16, with their protective layers 17 in-situ in the block 14. The block 14 together with new fissile and "old" fertile material, can subsequently be re-loaded into the reactor for a further period of irradiation.

Figure 4:
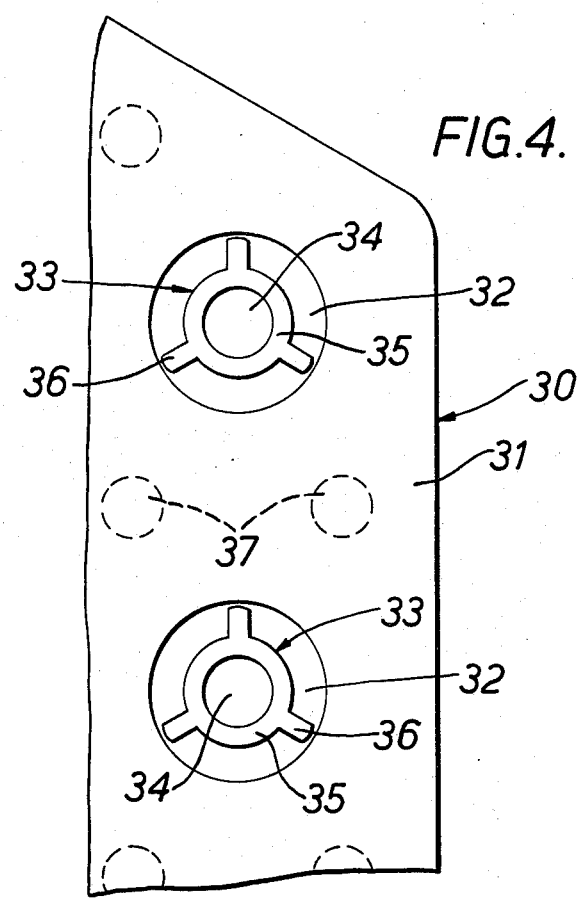

With reference to FIG. 4, a nuclear fuel unit 30 for a gas-cooled reactor of the thermal type comprises a moulded block 31 formed by a mixture of fertile material (U-238 or Thorium) in particle form, and graphite powder, co-pressed with binder resin which is subsequently carbonised by heat treatment. The block 31 is penetrated from end to end by coolant channels 32 which locate plutonium-bearing fuel pins 33. The fuel pins 33 comprise plutonium fuel in the form of cylindrical compacts 34 of coated particles enclosed in an outer protective tube 35 of graphite provided with support and centralizing ribs 36. Reactor coolant flowing through the channels 32 removes heat from the fissile material of the fuel elements 33. Additional coolant channels 37 may optionally be provided in the block 31. In this example the block 31 comprises the outer fertile region of the invention.

The arrangement of FIG. 4, which is a modification of that illustrated by FIG. 3, results in substantially more fertile material being used than in the other examples. The reactor coolant channels 32 and 37 may be lined with sacrificial layers of graphite. The surfaces of the block 31 may also be covered with sacrificial layers of graphite. The sacrificial layers accept rubbing of the blocks 31 during handling, and in the case of the layers in the channels 32 and 37, also resist corrosion by any impurities present in the reactor coolant.

In each of the above examples, the fertile material used is large relative to the fissile material used.

Figure 5:
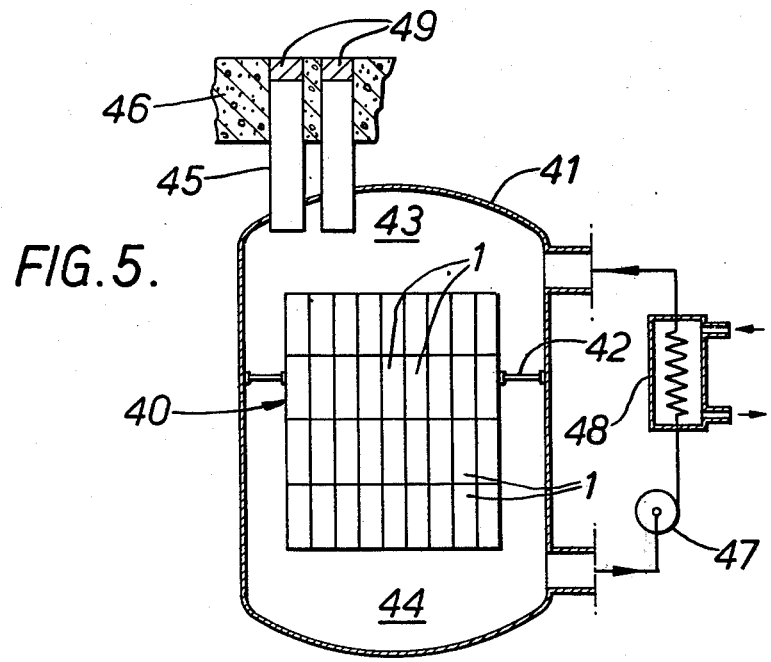

FIG. 5 shows how the nuclear fuel units (in this case the units of FIG. 1) are stacked together to form the active part of a reactor core 40. The core 40 is disposed in a pressure vessel 41 and an annular seal 42 divides the interior of the vessel into upper and lower plenum spaces 43, 44. Reactor coolant (helium) enters the upper plenum space 43 to pass downwardly through the reactor core and leave the pressure vessel by way of the lower plenum space 44. The fuel units are removed and replaced by way of stand pipes 45 extending upwardly from the pressure vessel 41 to the upper surface of a concrete shield/floor 46. The reactor is provided with the usual control and shut-down devices. The reactor coolant is circulated in closed circuit by a blower 47, the circuit including a heat exchanger 48. The stand pipes 45 (only a few of which are shown) are sealed by removable plugs 49.

I claim:

1. A nuclear fuel unit for the reactor core of a gas-cooled nuclear reactor of the thermal type comprising a block of moderating material having an array of parallel holes formed therein, disposed in each hole a fissile material region formed from fissile plutonium, a fertile material region enclosing and surrounding each fissile material region in such manner that in a nuclear reactor the neutron flux thermalized by the block of moderating material must before reaching a fissile material region, encounter fertile material, and coolant channels for permitting gas coolant to remove heat from the fissile material regions.

2. A nuclear fuel unit as claimed in claim 1, wherein the fertile material is contained in annular regions disposed in said holes in such manner that they are interposed between the moderator material of the block and the fissile material region in the hole.

3. A nuclear fuel unit as claimed in claim 1, wherein the fertile material is mixed with the moderating material of the block.

4. A nuclear fuel unit as claimed in claim 1, wherein the fissile material region and the fertile material region are provided by a nuclear fuel element, the said element comprising an outer region containing the fertile material and enclosing an inner region containing the fissile plutonium, the inner region being disposed so as to be cooled by the reactor coolant.

5. A nuclear fuel unit as claimed in claim 4, wherein the inner region can be renewed independently of the outer region.

6. A gas-cooled nuclear reactor of the thermal type having a reactor core formed from a plurality of nuclear fuel units, each said unit comprising a block of moderating material having an array of parallel holes formed therein, disposed in each hole a fissile material region formed from fissile plutonium, a fertile material region enclosing and surrounding each fissile material region in such manner that the neutron flux thermalised by the block of moderating material must before reaching a fissile material region encounter fertile material, and coolant channels for permitting gas coolant to remove heat from the fissile material region.

7. A gas-cooled nuclear reactor as claimed in claim 6, wherein the fissile material region can be renewed independently of the fertile material region.

* * * * *